United States Patent
Bolton et al.

(10) Patent No.: US 9,674,374 B1
(45) Date of Patent: Jun. 6, 2017

(54) TRACKING DATA USAGE IN WIRELESS NETWORKS

(71) Applicant: Verizon Patent and Licensing Inc., Arlington, VA (US)

(72) Inventors: Jeremy P. Bolton, Madison, NJ (US); Luke D. VonFeldt, Killingworth, CT (US); Christopher M. Perry, Folsom, CA (US); Mamadou Mamoune Niang, Keller, TX (US); Barry F. Hoffner, Bridgewater, NJ (US); Mark Andrews, Rock Harbour, FL (US); Scott A. Townley, Bridgewater, NJ (US); Lixia Yan, Bedminster, NJ (US); Marc Chiaverini, Randolph, NJ (US); Javier A. Ferro, Somerset, NJ (US); Hiywote Demisse, Bridgewater, NJ (US); Ratul K. Guha, Kendall Park, NJ (US); Jolly Lal, Belle Mead, NJ (US); Romeo R. Tan, East Brunswick, NJ (US); Uma Venkata Raman, Somerset, NJ (US); Bhaskar Srinivasiah, Johns Creek, GA (US); Jonathan B. Ofri, Bridgewater, NJ (US); Alexis Polanco, Jr., Woodbridge, NJ (US); Mark Gilbert, Radnor, OH (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/246,055

(22) Filed: Aug. 24, 2016

(51) Int. Cl.
*H04M 11/00* (2006.01)
*H04M 15/00* (2006.01)

(52) U.S. Cl.
CPC ........... *H04M 15/88* (2013.01); *H04M 15/59* (2013.01)

(58) Field of Classification Search
None
See application file for complete search history.

(56) References Cited

U.S. PATENT DOCUMENTS

2013/0084878 A1* 4/2013 Chen ..................... H04W 72/10
455/452.1

* cited by examiner

Primary Examiner — Suhail Khan

(57) ABSTRACT

A method may include determining a number of user devices that can access data services in a wireless network and storing information identifying the determined number of user devices for each of a number of sectors for each of a number of periods of time. The method may also include receiving a request from a first user device associated with a first user for access to data services during a first period of time, accessing the stored information to determine whether to grant the request and providing access to data services via the wireless network to the first user device. The method may further include excluding data usage by the first user device during the first period of time from being applied against a data limit associated with the user's data plan.

20 Claims, 15 Drawing Sheets

| | ENODE B | SECTOR | CARRIER | TIME WINDOWS | | | | | |
|---|---|---|---|---|---|---|---|---|---|
| | | | | 1:00-1:15 | 1:15-1:30 | 1:30-1:45 | 1:45-2:00 | 2:00-2:15 | 2:15-2:30 |
| 802-1 | 210001 | 1 | 1 | 1 | 3 | 5 | 5 | 0 | 0 |
| 802-2 | 210001 | 2 | 1 | 0 | 1 | 4 | 3 | 4 | 2 |
| 802-3 | 210001 | 3 | 1 | 5 | 4 | 4 | 3 | 5 | 5 |
| 802-4 | 210002 | 1 | 1 | 4 | 5 | 4 | 5 | 5 | 2 |
| 802-5 | 210002 | 1 | 2 | 1 | 1 | 0 | 5 | 5 | 3 |
| | 210002 | 2 | 1 | 0 | 2 | 3 | 0 | 4 | 4 |
| | 210004 | 1 | 1 | 0 | 2 | 2 | 1 | 2 | 4 |
| | 210004 | 2 | 1 | 0 | 1 | 3 | 5 | 0 | 4 |
| | 210004 | 3 | 1 | 3 | 4 | 5 | 1 | 4 | 4 |
| | 210055 | 1 | 1 | 3 | 0 | 2 | 2 | 3 | 5 |
| | 210055 | 2 | 1 | 4 | 5 | 0 | 4 | 2 | 4 |
| 802-12 | 210055 | 3 | 1 | 2 | 1 | 2 | 4 | 4 | 2 |
| | 210056 | 1 | 1 | 5 | 2 | 3 | 2 | 0 | 0 |

| ENODE B | SECTOR | CARRIER | 1:00-1:15 | 1:15-1:30 | 1:30-1:45 | 1:45-2:00 | 2:00-2:15 | 2:15-2:30 |
|---|---|---|---|---|---|---|---|---|
| 210001 | 1 | 1 | 1 | 3 | 5 | 5 | 0 | 0 |
| 210001 | 2 | 1 | 0 | 1 | 4 | 3 | 4 | 2 |
| 210001 | 3 | 1 | 5 | 4 | 4 | 3 | 5 | 5 |
| 210002 | 1 | 1 | 4 | 5 | 4 | 5 | 5 | 2 |
| 210002 | 1 | 2 | 1 | 1 | 0 | 5 | 5 | 3 |
| 210002 | 2 | 1 | 0 | 2 | 3 | 0 | 4 | 4 |
| 210004 | 1 | 1 | 0 | 2 | 2 | 1 | 2 | 4 |
| 210004 | 2 | 1 | 0 | 1 | 3 | 5 | 0 | 4 |
| 210004 | 3 | 1 | 3 | 4 | 5 | 1 | 4 | 4 |
| 210055 | 1 | 1 | 3 | 0 | 2 | 2 | 3 | 5 |
| 210055 | 2 | 1 | 4 | 5 | 0 | 4 | 2 | 4 |
| 210055 | 3 | 1 | 2 | 1 | 2 | 4 | 4 | 2 |
| 210056 | 1 | 1 | 5 | 2 | 3 | 2 | 0 | 0 |

FIG. 8

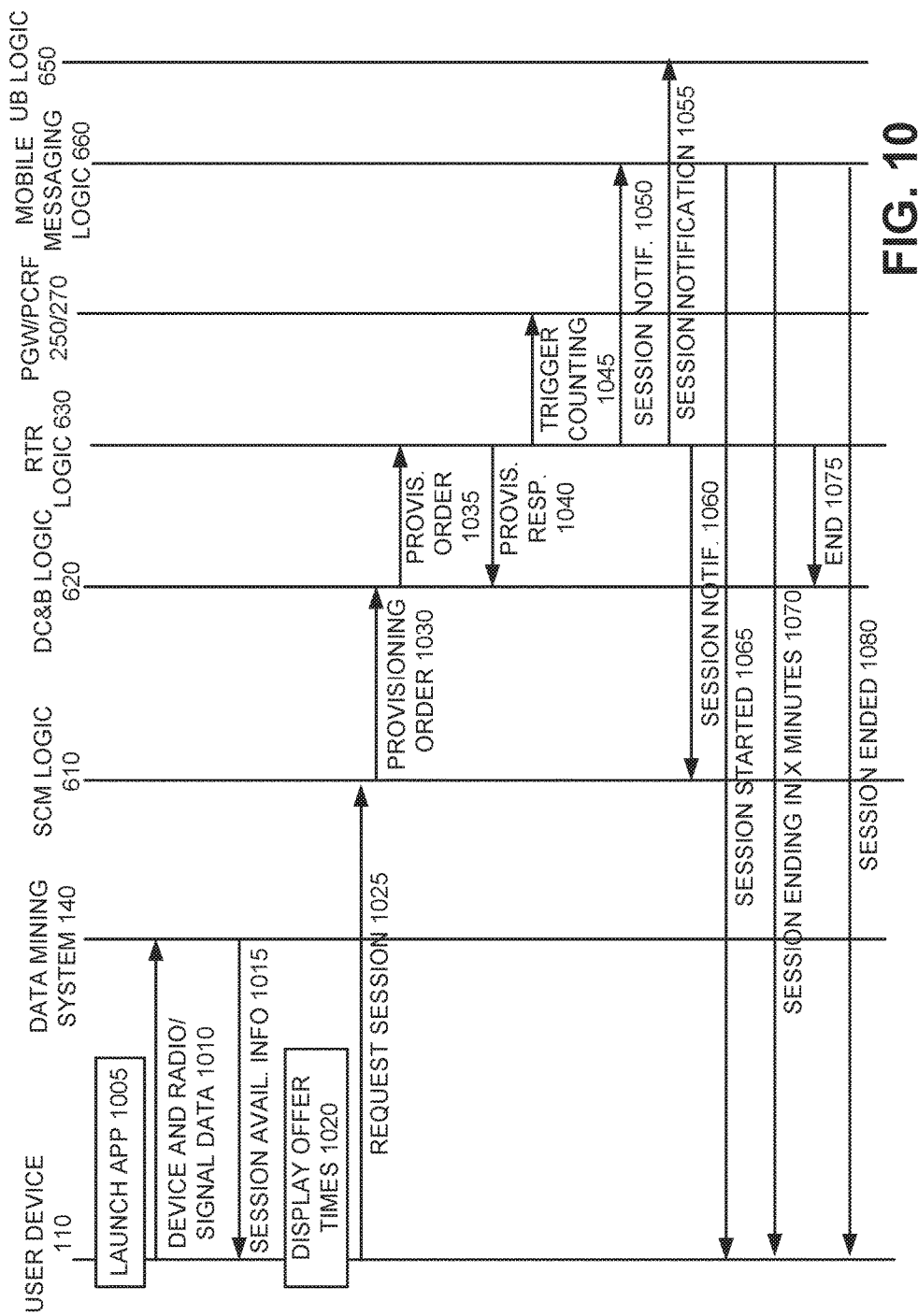

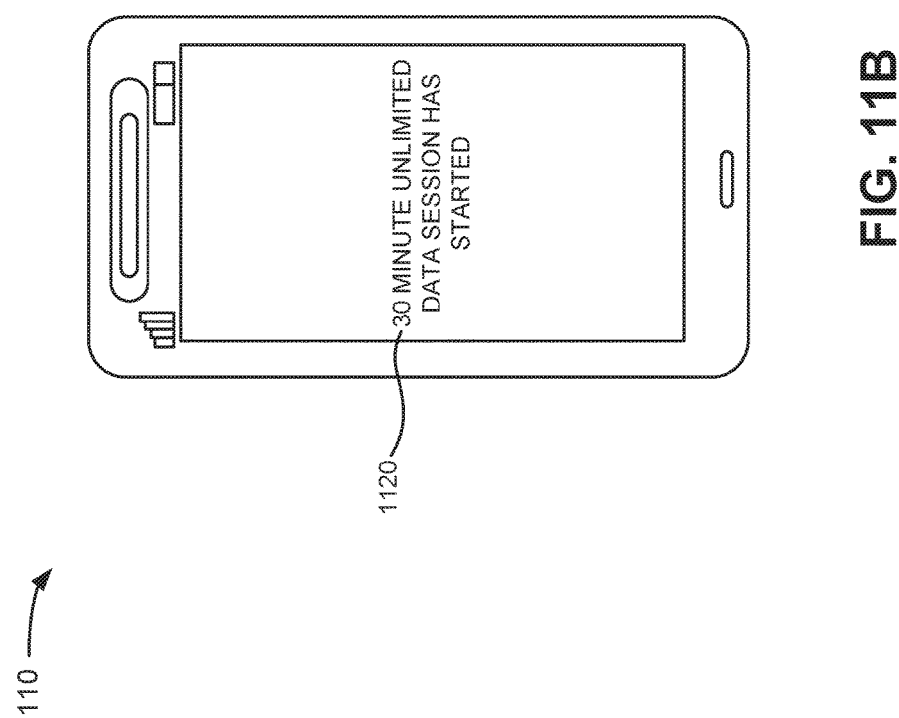

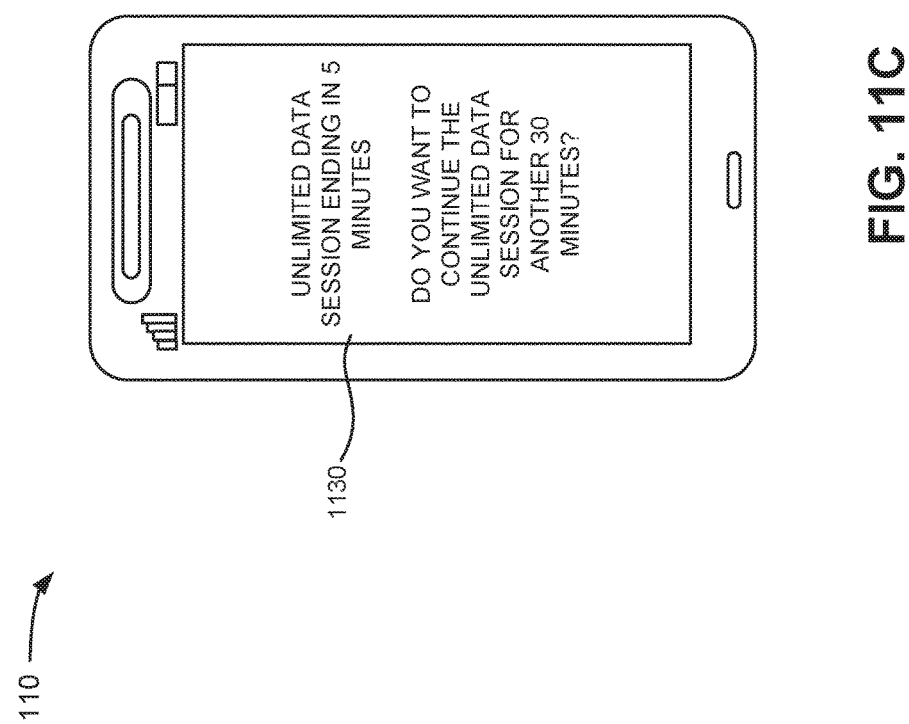

TRACKING DATA USAGE IN WIRELESS NETWORKS

BACKGROUND INFORMATION

Wireless broadband network service providers typically provide a customer with a predetermined amount of data usage over a period of time, such as one month, based on the customer's data plan. If the customer exceeds the predetermined amount of data usage associated with his/her plan, the service provider may penalize the customer for the additional amount of data usage above the plan limit, based on parameters established by the customer's particular data plan. Such data service plans typically make a customer cautious in using high bandwidth applications (e.g., data streaming applications) to avoid exceeding his/her data plan limit.

BRIEF DESCRIPTION OF THE DRAWINGS

FIG. 8 illustrates a mapping table generated in accordance with the processing of FIG. 7;

FIG. 10 is a signal flow diagram associated with the processing of FIG. 9;

FIGS. 11A-11C illustrate information displayed by the user device of FIG. 1 in accordance with an exemplary implementation.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to providing access to wireless data services on a time rated basis. For example, a service provider may dynamically estimate future network usage and determine an expected excess network capacity during various future periods of time. The service provider may then offer the excess capacity to customers during the various periods of excess capacity as units of time, as opposed to offering a particular amount of data usage. In some instances, the service provider may offer unlimited data access during the time periods that are available as a part of a bundled plan or for a per-time slot charge, with the customer's data usage during these time periods not counting against the customer's monthly plan limit.

When customers use the wireless service during time slots that would otherwise be unused, overall network utilization increases as a result of the increase in efficiency of the resource usage. For example, use of cell capacity and network capacity may be increased, resulting in optimized cell and network capacity and bandwidth usage. In addition, having a more fully loaded or utilized network allows the service provider to more accurately determine full network capacity under actual conditions. For example, loading the network to full or near full capacity by using otherwise unused time slots may allow the service provider to determine how much data capacity/load the wireless network can actually handle, as opposed to a theoretical maximum load. In addition, monitoring the wireless network under fully or nearly fully loaded conditions may allow the service provider to identify locations where additional network resources are needed to ensure and/or improve network availability and reliability.

Figure 1:
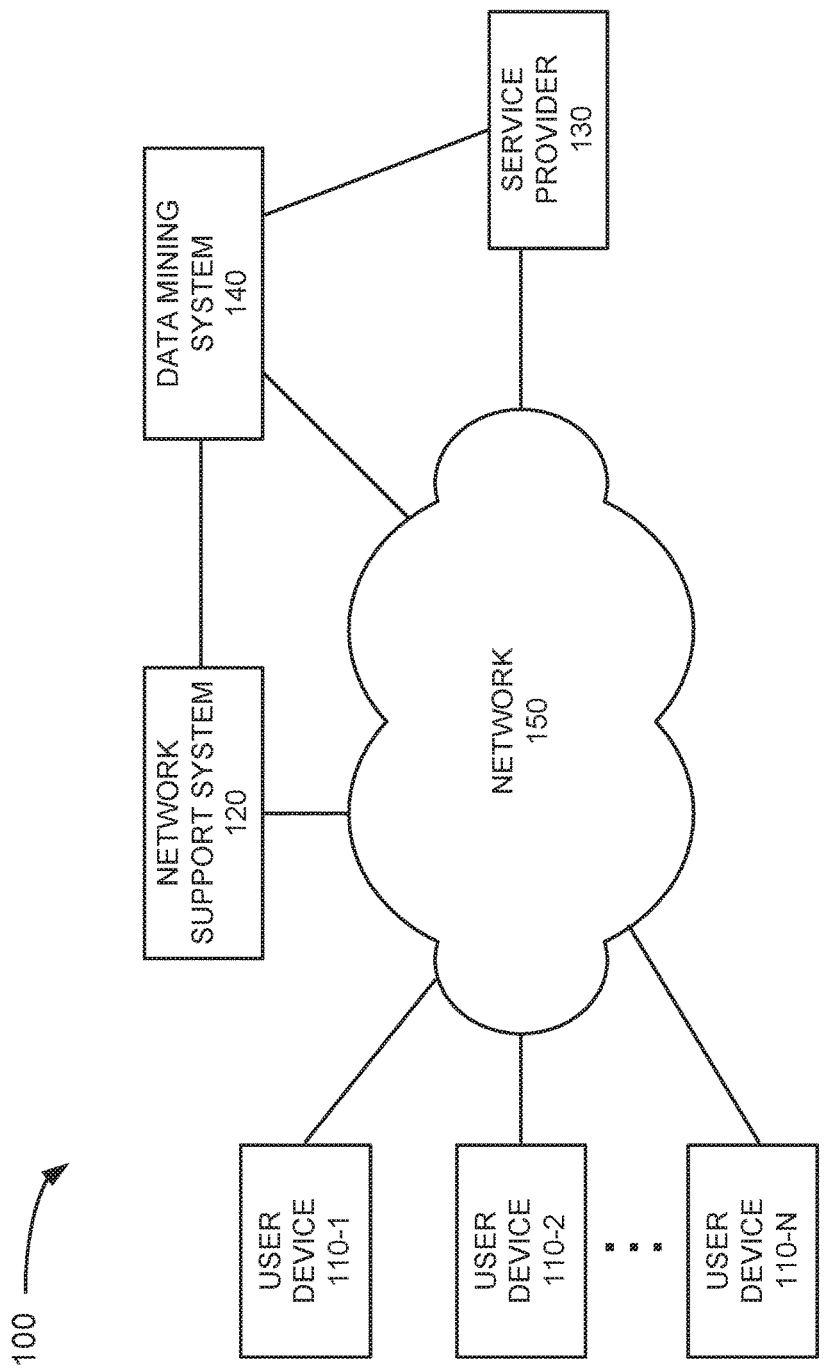
FIG. 1 illustrates an exemplary environment in which systems and methods described herein may be implemented.

FIG. 1 is a block diagram of an exemplary environment 100 in which systems and methods described herein may be implemented. Environment 100 may include user devices 110-1 through 110-N, network support system (NSS) 120, service provider 130, data mining system 140 and network 150.

User devices 110-1 through 110-N (individually referred to as user device 110-x or 110 and collectively as user devices 110) may include a mobile device, such as wireless or cellular telephone device (e.g., a conventional cell phone with data processing capabilities), a smart phone, a personal digital assistant (PDA) that can include a radiotelephone, etc. In another implementation, user devices 110 may include any type of mobile computer device or system, such as a personal computer (PC), a laptop, a tablet computer, a notebook, a netbook, a wearable computer (e.g., a wrist watch, eyeglasses, etc.), a game playing device, a music playing device, a home appliance device, a home monitoring device, etc., that may include communication functionality and user interface functionality. In still another implementation, user devices 110 may include a home broadband router or other network device that provides network services, such as video and data services to, for example, a customer premises, home or business location. User devices 110 may connect to network 150 and other devices in environment 100 (e.g., NSS 120, service provider 130, data mining system 140, etc.) via any conventional technique, such as wired, wireless, optical connections or a combination of these techniques. User device 110 and the person associated with user device 110 (e.g., the party holding or using user device 110) may be referred to collectively as user device 110 in the description below.

NSS 120 may include one or more computing devices or systems used to estimate utilization of network 150. For example, NSS 120 may communicate with base stations, eNodeBs, gateways, specialized data monitoring devices, etc., to determine loading conditions on network 150. NSS 120 may also access historical data usage associated with network 150 during various times of day to estimate future network load conditions, such as whether excess capacity will be available during various time periods, as described in more detail below.

Service provider 130 may include one or more computer devices and systems associated with providing wireless services via network 150. For example, service provider 130 may store information regarding service plans for a large number of subscribers (also referred to herein as customers) and track data usage for each subscriber over a period of time e.g., one month). Service provider 130 may communicate with NSS 120 to identify future time periods that may be offered to subscribers for data service, as described in more detail below.

Data mining system 140 may include one or more computing devices or systems used to obtain and store data regarding usage of network 150 by user devices 110. In one implementation, data mining system 140 may interface with network support system 120 and service provider 130 to determine whether a customer can be provided with an unlimited data session based on expected excess capacity in network 150.

Network 150 may include one or more wired, wireless and/or optical networks that are capable of receiving and transmitting data, voice and/or video signals. For example, network 150 may include one or more public switched telephone networks (PSTNs) or other type of switched network. Network 150 may also include one or more wireless networks and may include a number of transmission towers for receiving wireless signals and forwarding the wireless signals toward the intended destination. Network 150 may further include one or more satellite networks, one or more packet switched networks, such as an Internet protocol (IP) based network, a local area network (LAN), a wide area network (WAN), a long term evolution (LTE) network, a personal area network (PAN), a WiFi network, a Bluetooth network, an intranet, the Internet, or another type of network that is capable of transmitting data. Network 150 provides wireless packet-switched services and wireless Internet protocol (IP) connectivity to user devices 110 to provide, for example, data, voice, and/or multimedia services.

The exemplary configuration illustrated in FIG. 1 is provided for simplicity. It should be understood that a typical network may include more or fewer devices than illustrated in FIG. 1. For example, environment 100 may include a large number (e.g., thousands or more) of user devices 110, multiple NSSs 120 and multiple data mining systems 140. In addition, network 150 may include additional elements, such as eNodeBs, base stations, switches, gateways, routers, monitoring devices, etc., that aid in routing data and collecting information regarding network conditions.

In addition, various functions are described below as being performed by particular components in environment 100. In other implementations, various functions described as being performed by one device may be performed by another device or multiple other devices, and/or various functions described as being performed by multiple devices may be combined and performed by a single device.

Figure 2:
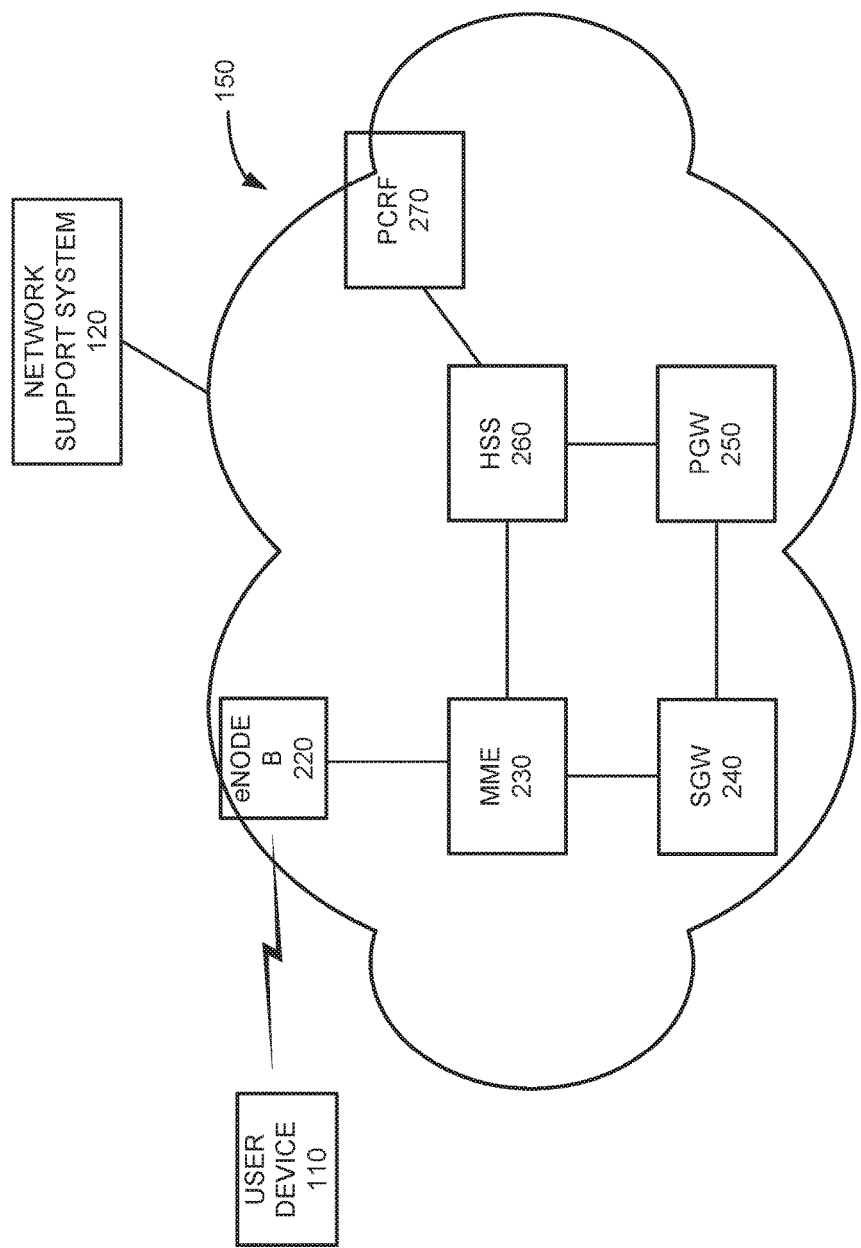
FIG. 2 illustrates an exemplary configuration of components implemented in a portion of the network of FIG. 1.

FIG. 2 is an exemplary block diagram illustrating a portion of network 150. In the implementation depicted in FIG. 2, network 150 is a long term evolution (LTE) network. It should be understood, however, that embodiments described herein may operate in other types of wireless networks, such as networks operating in accordance with other networking standards, such as Evolution-Data Optimized (1xEv-DO), Global System for Mobile Communications (GSM), Universal Mobile Telecommunications System (UMTS), IS-200, etc.

Network 150 may include an evolved Node B (eNodeB) 220, and an evolved packet core (ePC) that includes mobile management entity (MME) 230, serving gateway (SGW) 240, packet gateway (PGW) 250, home subscriber server (HSS) 260 and policy and charging rules function (PCRF) 270. eNodeB 220 may be part of an evolved Universal Mobile Telecommunications System (UMTS) Terrestrial Radio Access Network (eUTRAN).

eNodeB 220 may include one or more devices and other components having functionality that allow user devices 110 to wirelessly connect to network 150. eNodeB 110 may be associated with one or more cells/sectors. For example, each cell or sector in network 150 may include one or more radio frequency (RF) transceivers pointed in a particular direction. In one implementation, some of the eNodeBs 220 may be associated with multiple sectors (e.g., 2, 3 or more) of network 150. In such an implementation, an eNodeB 220 may include multiple RF transceivers pointed in different directions to service different geographic areas. The term "sector" as used herein shall be broadly construed as any geographic coverage area associated with an eNodeB, base station or other element of a radio network, and may be used interchangeably with the term "cell." Each sector in network 150 may also be associated with multiple carriers. For example, an eNodeB 220 may include multiple radios that operate at different frequencies or different frequency bands in the same sector.

eNodeB 220 may interface with MME 230. MME 230 may include one or more devices that implement control plane processing for network 150. For example, MME 230 may implement tracking and paging procedures for user devices 110, may activate and deactivate bearers for user devices 110, may authenticate respective users of user devices 110, and may interface with non-LTE radio access networks. A bearer may represent a logical channel with particular quality of service (QoS) requirements, and can be used in some embodiments to control packet flows as described herein. MME 230 may also select a particular SGW 240 for a particular user device 110. MME 230 may interface with other MME devices (not shown) in network 150 and may send and receive information associated with user devices 110, which may allow one MME 230 to take over control plane processing of user devices 110 serviced by another MME 230, if the other MME 230 becomes unavailable.

SGW 240 may provide an access point to and from user devices 110, may handle forwarding of data packets for user devices 110, and may act as a local anchor point during handover procedures between eNodeBs 220. SGW 240 may interface with PGW 250. PGW 250 may function as a gateway to a core network, such as a wide area network (WAN) (not shown) that allows delivery of Internet protocol (IP) services to user devices 110. PGW 250 may also identify packets associated with a particular data sessions, such as an unlimited data session, and aid in ensuring that the identified packets are process and billed in accordance with offers provided by service provider 130.

HSS 260 may store information associated with user devices 110 and/or information associated with users of user devices 110. For example, HSS 260 may store user profiles that include authentication and access authorization information. Each user/subscription profile may include a list of user devices 110 associated with the subscriptions as well as an indication of which user devices 110 are active (e.g., authorized to connect to network 150).

PCRF 270 may implement policy charging and rule functions, such as providing quality of service (QoS)

requirements, bandwidth and/or charges for a particular service for user devices 110. PCRF 270 may determine how a certain service data flow will be treated, and may ensure that user plane traffic mapping and treatment is in accordance with a user's subscription profile, For example, PCRF 270 may identify and count packets associated with an unlimited data session provided by service provider 130 and ensure that data usage during the unlimited session is not counted against a user's allotment of data under the user's data plan.

Although FIG. 2 shows exemplary components of network 150, in other implementations, network 150 may include fewer components, different components, differently arranged components, or additional components than depicted in FIG. 2. For example, network 150 may include a large number of eNodeBs 220, MMEs 230, SGWs 240, PGWs 250 HSSs 260 and PCRFs 270. Additionally, or alternatively, one or more components of network 150 may perform functions described as being performed by one or more other components.

Figure 3:
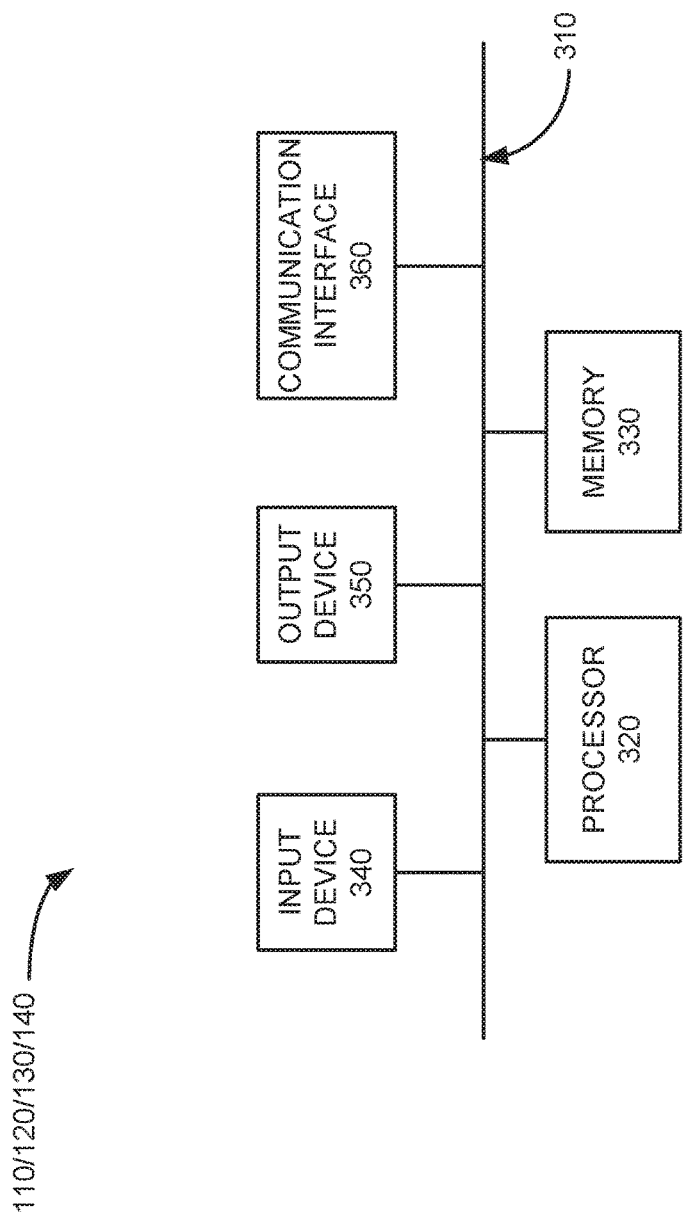
FIG. 3 illustrates an exemplary configuration of logic components included in one or more of the devices of FIG. 1.

FIG. 3 illustrates an exemplary configuration of NSS 120. Other devices in environment 100, such as user device 110, service provider 130 and data mining system 140 may be configured in a similar manner. Referring to FIG. 3, NSS 120 may include bus 310, processor 320, memory 330, input device 340, output device 350 and communication interface 360. Bus 310 may include a path that permits communication among the elements of NSS 120.

Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SDD). Memory 330 may also include a magnetic and/or optical recording medium (e.g., a hard disk) and its corresponding drive.

Input device 340 may include a mechanism that permits a user to input information to NSS 120, such as a keyboard, a keypad, a mouse, a pen, a microphone, a touch screen, voice recognition and/or biometric mechanisms, etc. Output device 350 may include a mechanism that outputs information to the user, including a display (e.g., a liquid crystal display (LCD)), a printer, a speaker, etc. In some implementations, a touch screen display may act as both an input device and an output device.

Communication interface 360 may include one or more transceivers that NSS 120 (or user device 110, service provider 130 or data mining system 140) uses to communicate with other devices via wired, wireless or optical mechanisms. For example, communication interface 360 may include one or more radio frequency (RF) transmitters, receivers and/or transceivers and one or more antennas for transmitting and receiving RF data via network 150. Communication interface 360 may also include a modem or an Ethernet interface to a LAN or other mechanisms for communicating with elements in a network, such as network 150 or another network.

The exemplary configuration illustrated in FIG. 3 is provided for simplicity. It should be understood that NSS 120 (or user device 110, service provider 130 or data mining system 140) may include more or fewer devices than illustrated in FIG. 3. In an exemplary implementation, NSS 120 (or user device 110, service provider 130 or data mining system 140) perform operations in response to processor 320 executing sequences of instructions contained in a computer-readable medium, such as memory 330. A computer-readable medium may be defined as a physical or logical memory device. The software instructions may be read into memory 330 from another computer-readable medium (e.g., a hard disk drive (HDD), SSD, etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

Figure 4:
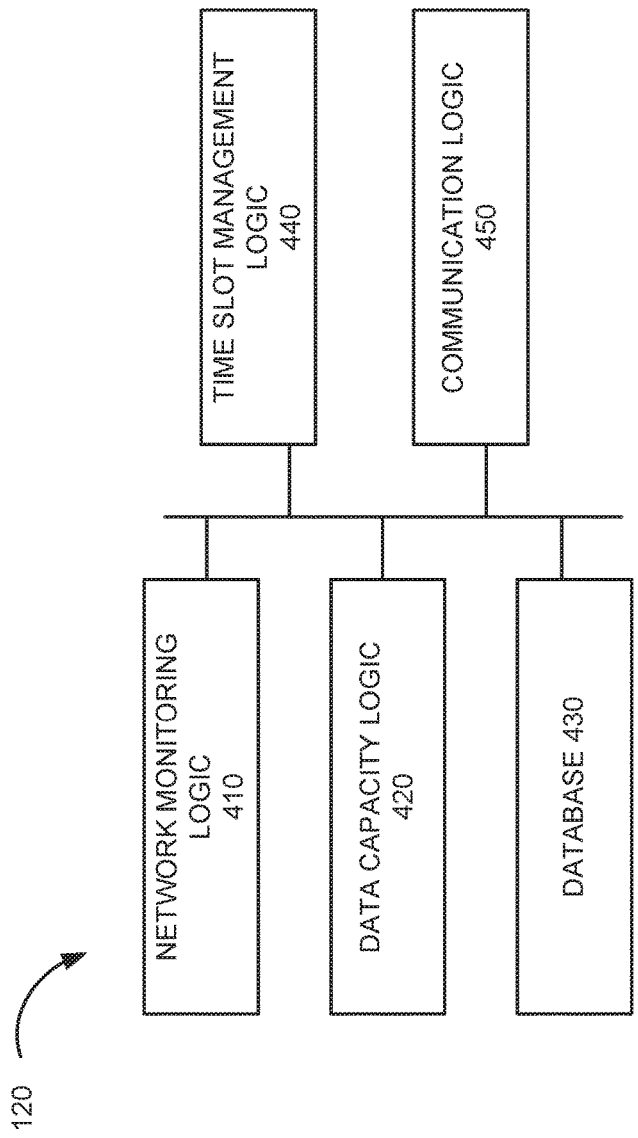
FIG. 4 illustrates an exemplary configuration of logic components implemented by one of the devices of FIG. 1.

FIG. 4 is an exemplary functional block diagram of components implemented in NSS 120. In an exemplary implementation, all or some of the components illustrated in FIG. 4 may be implemented by processor 320 executing software instructions stored in memory 330.

NSS 120 may include network monitoring logic 410, data capacity logic 420, database 430, time slot management logic 440 and communication logic 450. In alternative implementations, these components or a portion of these components may be located externally with respect to NSS 120.

Network monitoring logic 410 may include logic to identify data usage on network 150 during actual loading conditions in real time or near real time, or based on historical network data. In one implementation, network monitoring logic 410 may communicate with various gateways, eNodeBs and network monitoring devices located throughout network 150 to identify data usage on network 150. In addition, network monitoring logic 410 may identify total data traffic on a per sector basis. For example, network monitoring logic 410 may gather radio performance measurements from each sector site in network 150 over various periods of time. Network monitoring logic 410 may store this information in database 430.

Data capacity logic 420 may include logic to identify the capacity of each sector in network 150. In some instances, the capacity may vary over time. For example, based on addition of new equipment in a particular cell, the capacity may increase. Alternatively, if equipment is being serviced in a particular sector, the network capacity for that cell may decrease. The data capacity for a particular sector may also incorporate various metrics, such as cell bandwidth, spectral efficiency, propagation characteristics, etc. Data capacity logic 420 may store current capacity information in database 430.

Database 430 may includes one or more data storage devices that store one or more databases of information associated with network 150. For example, as described above, network monitoring logic 410 may store data usage information on a per sector level granularity in database 430. In addition, data capacity logic 420 may store data capacity information for network 150 on a per sector level granularity in database 430.

Time slot management logic 440 may include logic to determine the current or expected unused capacity of network 150 on a per sector basis at any given time or over a period of time. For example, time slot management logic 440 may estimate an amount of data capacity in each sector that is expected to be unused for each of a number of different future periods of times (also referred to herein as time slots). Time slot management logic 440 may determine if excess data capacity can and should be provisioned or offered to various customers, as described more detail below.

Communication logic 450 may include logic to communicate with elements in environment 100 directly or via network 150. For example, communication logic 450 may provide alerts to customers or subscribers (e.g., user devices 110) associated with service provider 130. As another example, communication logic 450 may signal customers that time slots for data usage (e.g., streaming downloads) are available at particular periods of the time, as described in more detail below. Communication logic 450 may also provide information to service provider 130 regarding customers' usage of data.

Although FIG. 4 shows exemplary components of NSS 120, in other implementations, NSS 120 may include fewer components, different components, differently arranged components, or additional components than depicted in FIG. 4. In addition, functions described as being performed by one of the components in FIG. 4 may alternatively be performed by another one or more of the components of NSS 120.

Figure 5:
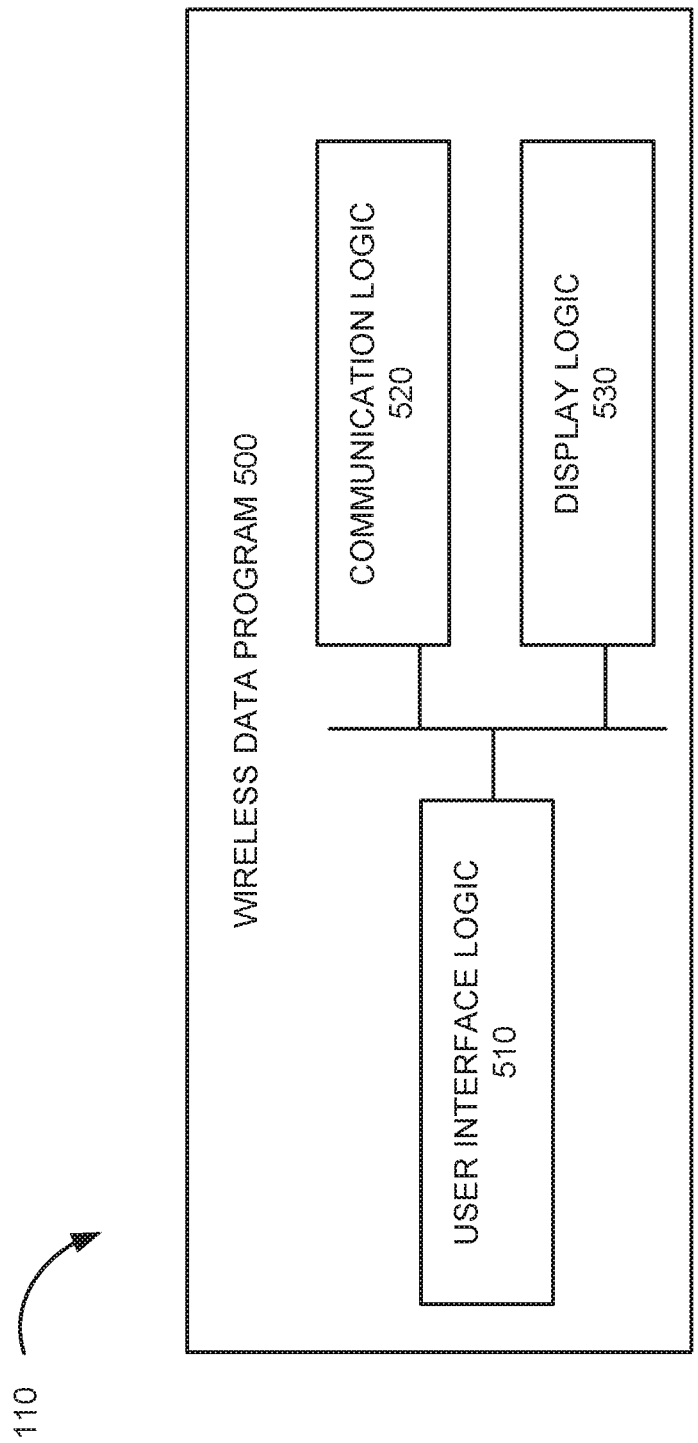
FIG. 5 illustrates exemplary configuration of logic components implemented in another one of the devices of FIG. 1.

FIG. 5 is an exemplary functional block diagram of components implemented in user device 110 of FIG. 1. Referring to FIG. 5, wireless data program 500 and its various logic components are shown in FIG. 5 as being included in user device 110. For example, wireless data program 500 may be stored in memory 330 of user device 110. In alternative implementations, these components or a portion of these components may be located externally with respect user device 110.

Wireless data program 500 may be an application program associated with the user's data plan provided by service provider 130. Wireless data program 500 may include software instructions executed by processor 320 that allows a user associated with user device 110 to request data usage during particular periods of time, or receive alerts from NSS 120 and/or service provider 130 indicating that "unlimited" data is available during particular periods of time. In some implementations, service provider 130 may not track or count the additional data usage against the user's data plan limits and may allow for unlimited data usage during particular periods of time, as described in more detail below.

Wireless data program 500 may include user interface logic 510, communication logic 520 and display logic 530. User interface logic 510 may include logic to facilitate requesting or accepting use of data services via network 150. For example, user interface logic 510 may include a graphical user interface (GUI) that allows a user to input information requesting or accepting a particular time slot for network access and use. In addition, the GUI of user interface ay allow a user to input information responding to an offer for data usage, as described in detail below.

Communication logic 520 may include logic for communicating with other devices in environment 100. For example, communication logic 520 may transmit and/or receive information from NSS 120 and service provider 130 via network 150. As an example, communication logic 520 may allow user device 110 to request use of an available time slot for a data streaming session. As another example, communication logic 520 may allow user device 110 to receive offers from NSS 120 and/or service provider 130 regarding use of excess network capacity.

Display logic 530 may include logic to display information received from, for example, NSS 120 and service provider 130. In one exemplary implementation, display logic 530 may output information to output device 350 of user device 110, such as an LCD or another type of display. As an example, display logic 530 may display a message from NSS 120 or service provider 130 indicating that unlimited data usage is available for a current or future time period. In some implementations, display logic 530 may also display how much time is remaining in a current unlimited data usage session, as described in more detail below.

Figure 6:
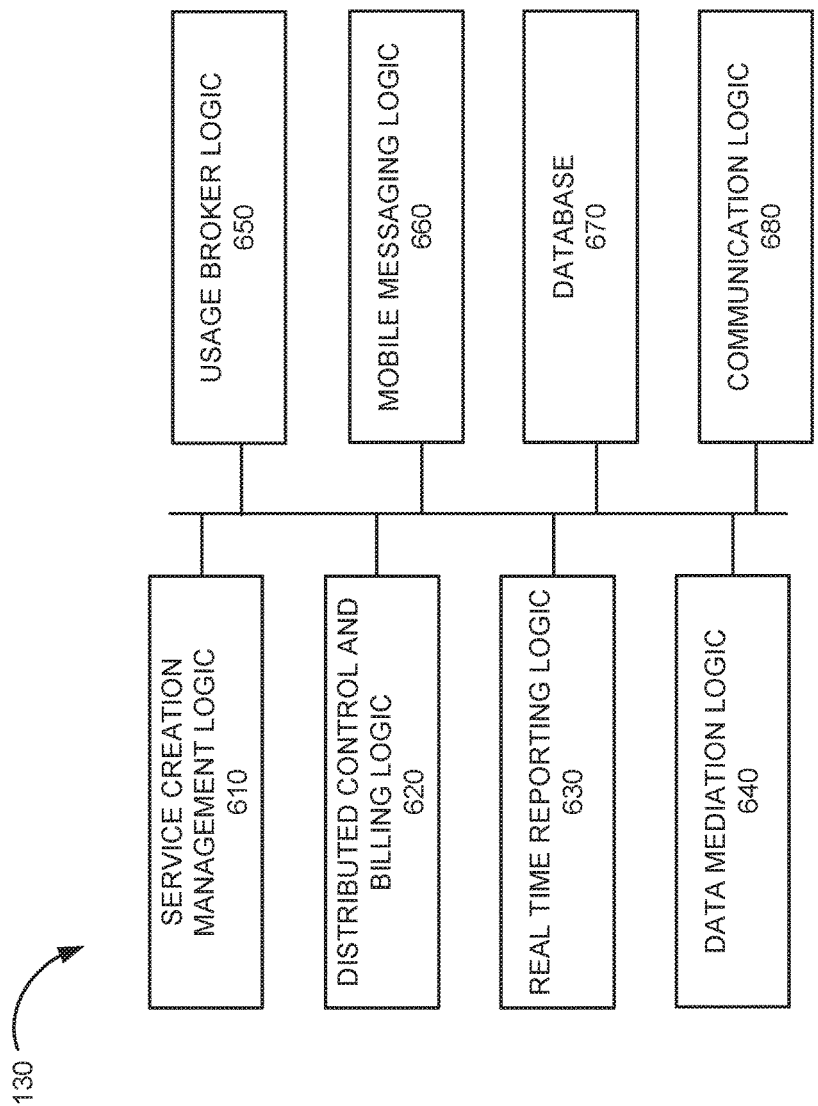
FIG. 6 illustrates an exemplary configuration of logic components implemented by yet another one or more of the devices of FIG. 1.

FIG. 6 is an exemplary functional block diagram of components implemented in service provider 130. In an exemplary implementation, all or some of the components illustrated in FIG. 6 may be implemented by processor 320 executing software instructions stored in memory 330 of service provider 130. In other implementations, some or all of these components may be executed by separate computing devices or systems and may be located remotely from one another and/or from service provider 130.

Service provider 130 may include service creation management (SCM) logic 610, distributed control and billing logic 620, real time reporting (RTR) logic 630, data mediation (DM) logic 640, usage broker logic 650, mobile messaging logic 660, database 670 and communication logic 680.

Service creation management logic 610 may include logic that receives requests associated with unlimited data sessions and processes the request to aid in provisioning the data sessions. In one implementation, SCM logic 610 may communicate with various systems, such as billing systems to ensure that unlimited data sessions are properly billed. Distributed control and billing logic 620 may include logic to receive provisioning orders and forward the provisioning orders to various devices associated with service provider 130 and network 150. For example, distributed control and billing logic 620 may act as an intermediary or front end device to forward billing information to a billing system associated with service provider 130.

Real time reporting (RTR) logic 630 may include logic that is involved in counting, tracking or triggering the counting of data usage in one implementation, RTR logic 630 may interface with counting elements to trigger counting of data usage for unlimited data sessions. RTR logic 630 may also trigger the initiation of messages to be sent to user devices 110, such as messages associated with the starting and ending of an unlimited data session. Data mediation logic 640 may include logic to aid in collection, mediating and distributing network usage records and billing records. For example, data mediation logic 640 may forward time detail records (TDRs) associated with data sessions to other devices associated with service provider 130 to ensure proper billing and accounting for the data usage.

Usage broker (UB) logic 650 may include logic associated with processing TDRs. For example, UB logic 650 may store start and end times for a customer's unlimited data session. UB logic 650 may also determine whether information associated with a customer's unlimited data session matches with TDRs generated by service provider 130. Database 670 may include one or more storage devices that store one or more databases associated with elements of service provider 130. For example, database 670 may store TDRs, billing rules associated with processing unlimited data session information, etc.

Communication logic 680 may include logic to communicate with devices in environment 100, such as user devices 110, NSS 120, data mining system 140, etc. Communication logic 680 may also enable service provider 130 to communicate with internal systems associated with billing, data usage, etc.

Although FIG. 6 shows exemplary components of service provider 130, in other implementations, service provider 130 may include fewer components, different components, differently arranged components, or additional components than depicted in FIG. 6. In addition, functions described as being performed by one of the components in FIG. 6 may alternatively be performed by another one or more of the components of service provider 130.

Figure 7:
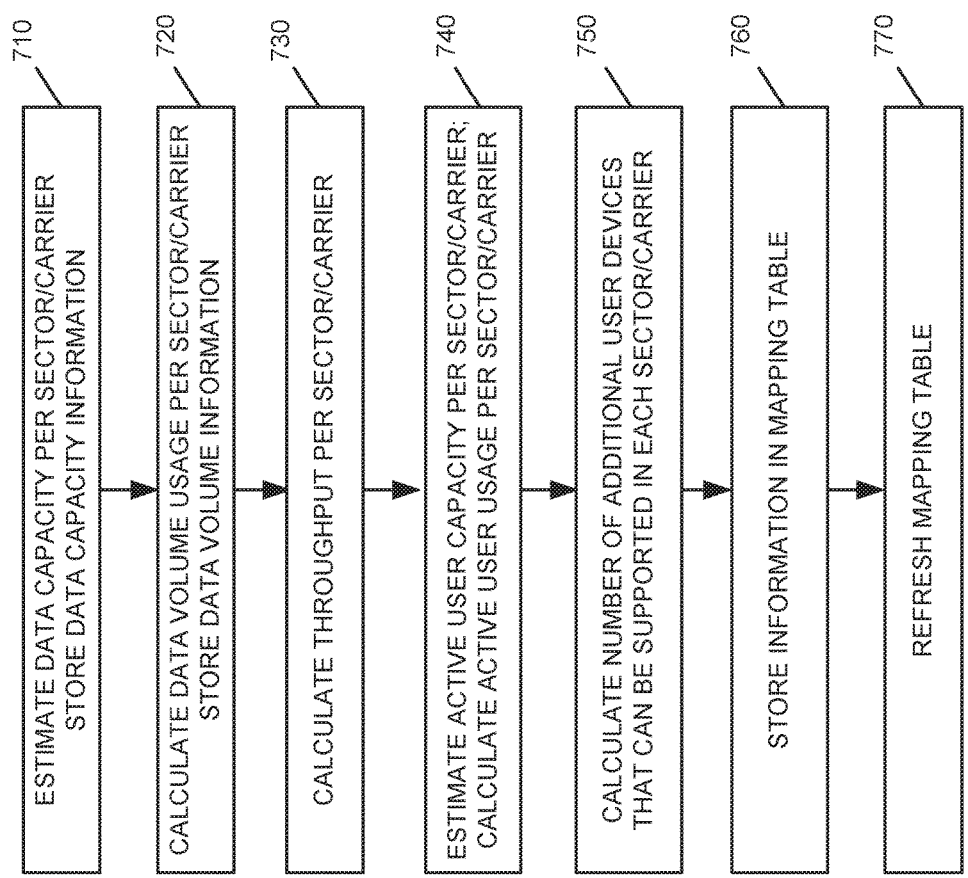
FIG. 7 is a flow diagram illustrating processing by various components illustrated in FIG. 1 in accordance with an exemplary implementation.

FIG. 7 is a flow diagram illustrating exemplary processing associated with determining available excess capacity in a wireless network, such as network 150. Processing may begin with NSS 120 estimating data volume (DV) capacity for sectors in network 150 (block 710). For example, data capacity logic 420 may determine the capacity of each sector in network 150 in megabytes per hour (MB/hour), megabits per second (Mb/s) or some other value. In some implementations, as described above, some of the eNodeBs 220 in network 150 may include multiple RF carriers per sector. In such implementations, data capacity logic 420 may determine the capacity for each carrier in each sector (referred to herein as a sector carrier). In addition, when estimating DV capacity in network 150, data capacity logic 420 may take into consideration underlying metrics associated with network 150, such as cell bandwidth, spectral efficiency, data propagation characteristics, etc. Data capacity logic 420 may store this information in database 430 (block 710).

NSS 120 may also estimate DV usage for each sector (block 720). For example, network monitoring logic 410 may estimate DV usage based on the actual usage of each sector and/or sector carrier in each sector over a predetermined number of time periods. In one implementation, network monitoring logic 410 may calculate DV usage as a percentage (e.g., 85%) of the actual usage on each sector carrier over the last N number of days in 15 minute time aggregation intervals, wherein N is any integer number (e.g., 1 day, 5 days, 7 days, etc.). It should also be understood that other time intervals may be used (e.g., 30 minute intervals, 60 minute intervals, etc.). In each case, network monitoring logic 410 estimates DV usage to capture local demand profile information for relatively short time intervals. Different systems, however, may use different values for the aggregation intervals. Network monitoring logic 410 may store this information in database 430 (block 720).

NSS 120 may also calculate data throughput (TP) for each sector (block 730). For example, network monitoring logic 410 may calculate data TP for each sector carrier in each sector over each selected time interval (e.g., 15 minute intervals). Calculating TP accounts for typical cell load that is observed in the particular sector carrier in the particular time interval. In some implementations, target throughput may also be estimated based on usage for different types of data, such as a high definition (HD) video stream. The target TP may be useful when the available capacity on a sector exceeds what is required to support applications, such as HD video streaming.

NSS 120 may further estimate active user (AU) capacity for each sector (block 740). For example, data capacity logic 420 may determine the number of users that can be active for each sector carrier of network 150 during each selected period of time, also referred to herein as transmission time interval (TTI) or time window. When estimating AU capacity in network 150, data capacity logic 420 may take into consideration underlying metrics associated with network 150, such as cell bandwidth, spectral efficiency, data propagation characteristics, etc.

NSS 120 may also calculate an average active user usage (AUUsg) value for each sector (block 740). For example, network monitoring logic 410 may estimate the average active user usage based on a percentage of the actual usage of each sector carrier over the last N days in each T minute time window. In one implementation, network monitoring logic 410 may estimate the average active user usage as about 85% of the actual active user usage for each sector carrier over the last N days in each T minute time window. Estimation of active user usage captures usage profile and demand that is observed in the particular sector carrier in the particular interval. In alternative implementations, other percentages may be used (e.g., average plus one standard deviation, average plus two standard deviations, etc.)

NSS 120 may then calculate the number of additional user devices that can be supported in each sector in each time window (block 750). For example, the additional number of user devices Z, where Z is an integer value, may correspond to the number of user devices that can access a particular sector/carrier above the number of user devices that are expected to use that sector/carrier in network 150 during a particular period of time. In other words, the number Z may correspond to additional time slots of data usage that are expected to be unused based on historical data usage. In one implementation, time slot management logic 440 may calculate Z using equation 1 below.

$$Z = \text{Max} [0, \text{Floor} (\text{MIN} ((DV\ capacity - DV\ usage)/(C*TP), AU\ capacity - AU\ usage))] \quad \text{Equation 1}$$

That is, time slot management logic 440 may calculate a number of users Z that can be supported by each sector carrier as the maximum of zero and a variable "Floor" in equation 1, corresponding to the minimum of the value calculated by subtracting DV usage from DV capacity and dividing the result by a constant "C" multiplied by the throughput (TP), and the value calculated by subtracting AU usage from AU capacity. In one implementation, the constant C in equation 1 is a value associated with converting Megabits per second into Megabytes per hour and is equal to the value 450. For example, C in equation 1 (which is multiplied by TP in the denominator of the first value from which the minimum value (i.e., MIN) is selected) may correspond to converting Mbits/second into Megabytes/hour and in one implementation is equal to 3600 seconds/hour divided by 8 bits/byte, which is equal to 450. Time slot management logic 440 may then take the maximum of zero and the minimum of the two values calculated for the variable "Floor" in equation 1. Time slot management logic 440 may repeat this calculation for each sector carrier for each period of time. NSS 120 uses the calculated Z values to populate a mapping table that identifies the number of slots for each interval of time that are available for use in each sector (block 760).

FIG. 8 illustrates mapping table 800, which includes eNode B field 810, sector field 820, carrier field 830 and time windows field 840. Mapping table 800 may be stored in database 430. eNodeB field 810 identifies various eNodeBs 220 in network 150. Sector field 820 identifies various sectors served by the corresponding eNodeBs 220. Each eNodeB 220 may service more than one sector (e.g., three or more sectors) in network 150, as illustrated in FIG. 8. For example eNodeB 210001 services the sectors, designated as sectors 1, 2 and 3. Carrier field 830 identifies a particular RF carrier associated with an eNodeB 220. For example, as described above, each eNodeB 220 may include multiple radios that operate at different frequencies or different frequency bands within the same sector. For example, eNodeB 210002 in sector 1 includes two sector carriers, designated as carriers 1 and 2.

Time windows field 840 (also referred to herein as time slots field 840) includes a number of 15 minute intervals of time throughout the day (a portion of which are illustrated in table 800). The values in the entries in time windows field 840 correspond to the Z values calculated in accordance with Equation 1 above, and identify the number of available time slots which are expected to be unused and available for customers' use. For example, in entry 802-1, which corresponds to eNodeB 210001, sector 1, carrier 1, there is one time slot available for the time period 1:00-1:15, three time slots available for the time period 1:15-1:30, five time slots available for the time period 1:30-1:45, etc., as indicated in time slots field 840 for entry 802-1. Time slots granted to user devices 110 may encompass multiple consecutive time windows, subject to availability in successive time windows.

Service provider 130 may make the identified time slots available to customers. For example, in one implementation, customers may request time slots via wireless data program 500. In some instances, a user may request a time slot and NSS 120 ay process the request on a first come, first served basis. In other instances, NSS 120 and/or service provider 130 may advertise the availability of the time slots to customers based on the customers' historic usage patterns and/or geographic locations. For example, NSS 120 and/or service provider 130 may access historic data usage indicating that a particular customer uses large amounts of data at a particular location and/or at a particular time of day (e.g., home between 8:00 PM and 9:00 PM). In this case, NSS 120 may send an offer to user device 110 associated with that particular customer indicating that unlimited data usage is available for that period of time at that particular customer's geographic location.

As described above, in some implementations, data usage during the time slots illustrated in mapping table 800 may correspond to an unlimited amount of data usage during that period of time. In addition, service provider 130 may not count or track usage corresponding to the requested time slots against the customers' data plan limits. For example, in one implementation, if a customer associated with user device 110-1 requests a time slot serviced by eNodeB 210001, sector 1 at 1:15-1:30 and NSS 120 grants the request, service provider 130 will not count data usage during this time slot against the customer's monthly allotment. In some instances, service provider 130 may make an offer to the customer for the unlimited data usage during the requested time slot. In some instances, service provider 130 may charge the customer a relatively low fee for the unlimited data usage during the requested time slot e.g., $1 or less for a one hour data session). In another instance, service provider 130 may offer the customer an option to view or evaluate certain content in exchange for the unlimited data usage during the requested time slot. For example, a customer may view an advertisement, participate in a short survey, etc., in exchange for an unlimited data session. This allows service provider 130 to more fully and efficiently utilize network capacity. As a result, overall network utilization increases. In addition, having a more fully loaded or utilized network allows service provider 130 to more accurately determine full network capacity under actual conditions, as opposed to a theoretical maximum capacity, In addition, monitoring network 150 under fully or nearly fully loaded conditions may allow service provider 130 to identify locations where additional network resources (e.g., eNodeBs, gateways, routers, etc.,) are needed to ensure or increase network availability and reliability.

NSS 120 may refresh mapping table 800 at predetermined periods of time (block 770). For example, NSS 120 may update mapping table daily, weekly, monthly, etc. In each case, mapping table 800 stores information identifying time periods in which excess network capacity is expected to exist. In addition, mapping table 800 may be regenerated to account for updated historical usage information. However, the refreshing or updating of mapping table 800 may exclude traffic volume changes associated with usage attributed to excess capacity in the time slots associated with mapping table 800 during the previous period of time.

Figure 9:
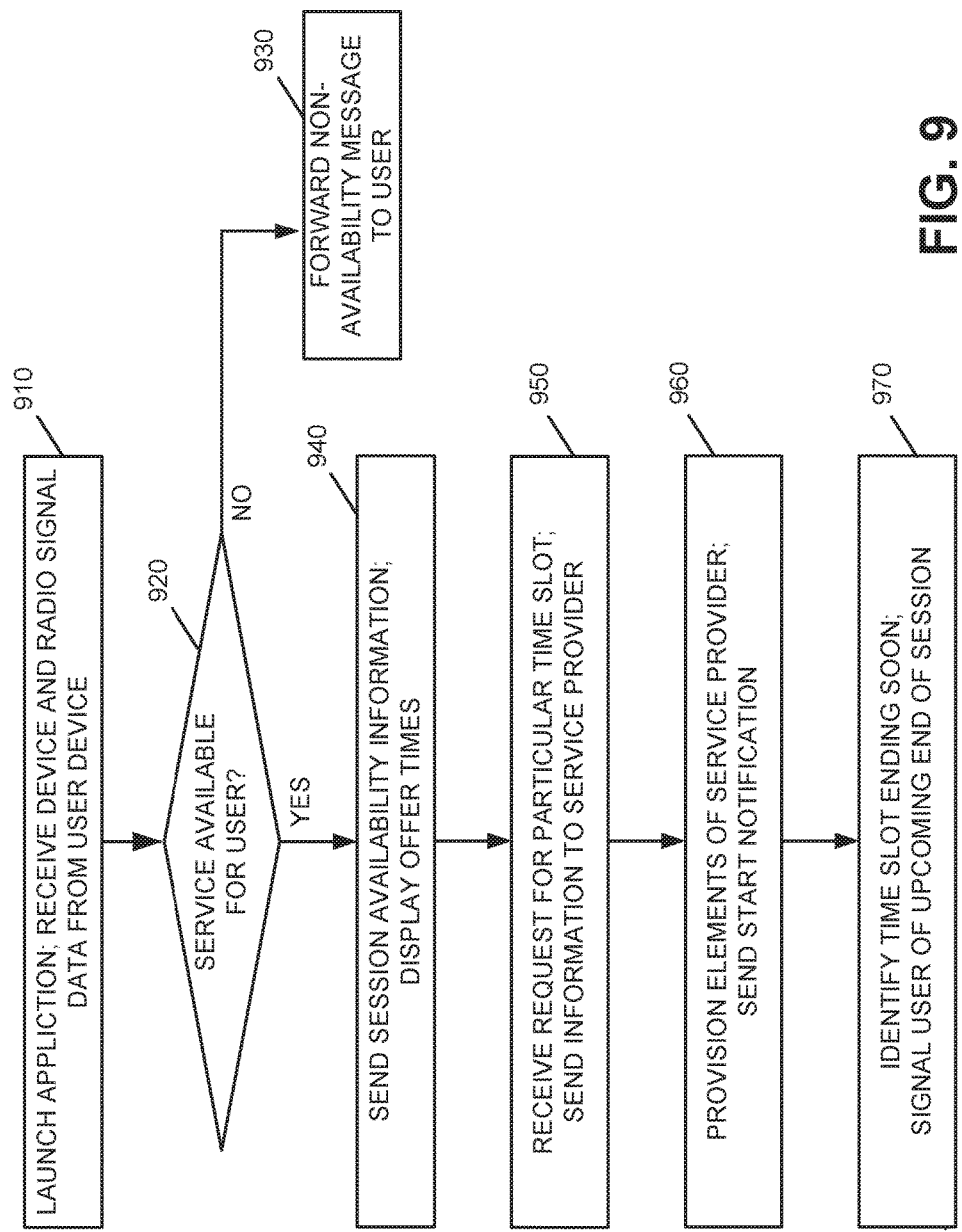
FIG. 9 is a flow diagram associated with requesting data services in accordance with an exemplary implementation.

FIG. 9 is a flow diagram illustrating processing associated with provisioning time slots for customer usage in network 150. FIG. 10 is a signal flow diagram associated with the flow diagram of FIG. 9 and will be described in conjunction with the processing illustrated in FIG. 9, Processing may begin with a user associated with user device 110 launching or accessing wireless data program 500 (FIG. 9, block 910; FIG. 10, 1005). Upon launching wireless data program 500, display logic 530 may display an "availability" icon or button on a screen of user device 110 that a user may select to determine the availability of unlimited, time-based data services. Assume that the user clicks on the availability icon/button.

Data mining system 140 and/or service provider 130 may obtain user device information and radio/signal measurements associated with the user device 110's connection to network 150 (FIG. 9, 910). For example, user device 110 may identify the radio access network, cell site, eNodeB 220 to which user device 110 is connected, RF signal strength, RF signal quality and RF noise parameters associated with the connection, etc., and forward this information to data mining system 140 (FIG. 10, 1010).

Data mining system 140 may determine if the customer can be provided with an unlimited data session during upcoming periods of time (block 920). For example, data mining system 140 may access table 800 and determine whether network 150 has available time slots (e.g., in the next 30-60 minutes) based on the particular user device 110's sector and carrier information. In addition, data mining system 140 may take into consideration the obtained radio/user device information when determining whether user device 110 is able to access available time slots. For example, if the RF signal strength associated with user device 110's connection to a particular eNodeB 220 is not adequate, data mining system 140 may determine that the unlimited data service is not available to user device 110.

Data mining system 140 may then send a response to user device 110 with either an "Available" or "Not Available" indication/flag (FIG. 10, 1015). If data mining system 140 determines that an unlimited data session is not available, wireless data program 500 may display a non-availability message to the subscriber via display logic 530 of user device 110 (block 930) In this example, assume that an unlimited data session is available. Data mining system 140 may provide session availability information to user device 110 (block 940; FIG. 10, 1015) and wireless data program 500 may then display the session availability information. The session availability information may include one or more offered session times (block 940; FIG. 10, 1020).

Figure 11A:
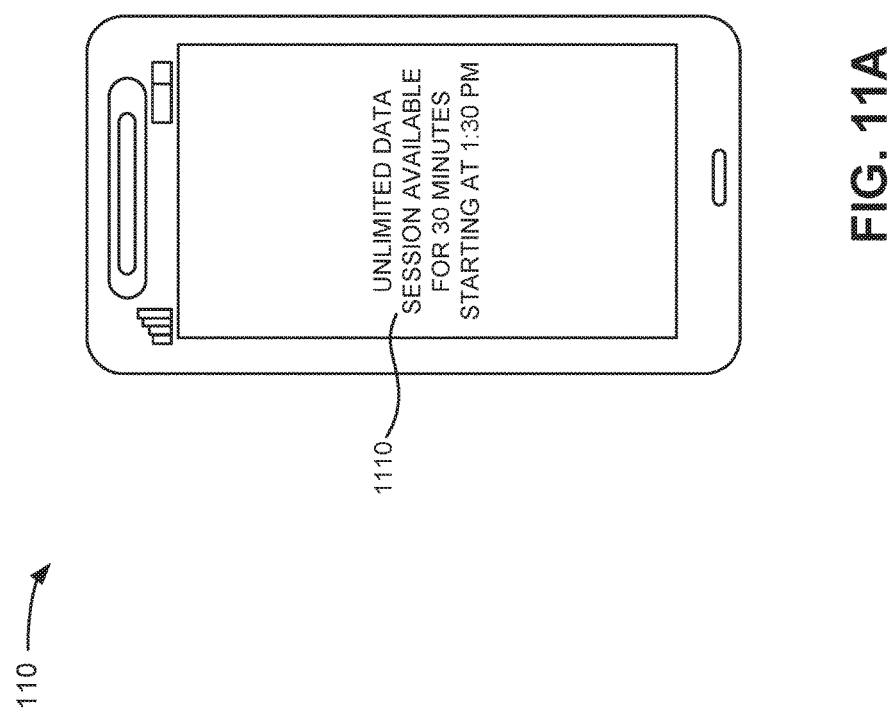

Further assume that a subscriber selects to receive an unlimited data session based on the displayed offers (block 950). If only one data session is offered/available, wireless data program 500 may display a message, such as message 1110 illustrated in FIG. 11A. Referring to FIG. 11A, user device 110, corresponding to a smart phone in this example, displays the message "unlimited data session available for 30 minutes starting at 1:30 PM." An optional cost associated with the unlimited data session and/or an optional advertisement, content or survey associated with the unlimited data session may be displayed on user device 110.

Assume that the customer selects the session illustrated in message 1110 and the current time is 1:25 PM. User device 110 forwards the selection to service provider 130. For example, user device 110 may forward the selection requesting the particular time slot to service creation management (SCM) logic 610 (block 950; FIG. 10, 1025). User device 110 may also notify data mining system 140 of the user's selection. SCM logic 610 receives the request and may determine user device eligibility, such as whether the customer profile in service provider 130's billing system indicates that the customer is approved to have additional charges automatically billed to the customer's account or is approved for other methods of charging the customer, such as credit card, debit card, etc. If the customer eligibility check fails. SCM logic 610 returns an appropriate message to user device 110 indicating the reason for the denial of the unlimited data session. If the customer eligibility check passes, SCM logic 610 sends the provisioning order to distributed control and billing logic 620 to provision the appropriate elements of service provider 130 to support the unlimited data session (block 960; FIG. 10, 1030).

Distributed control and billing logic 620 may then send the provisioning order to RTR logic 630 (FIG. 10, 1035). RTR logic 630 may then send back a provisioning response along with a provisioning time (FIG. 10, 1040). RTR logic 630 may also send triggers to network 150 to optionally start the counting process for the unlimited data session. For example, RTR logic 630 may send a trigger to PGW 250 (to which the user device 110 is connected) and PCRF 270 to start counting the unlimited data session usage (FIG. 10, 1045). In an exemplary implementation, customer data usage for an unlimited data session is counted in a separate "bucket" for reporting and reconciliation purposes such that data usage during the unlimited data session is not counted against the customer's monthly allotment of data. RTR logic 630 may also signal elements in network 150 (e.g., PGW 250 and PCRF 270) to tag time data records (TDRs) associated with the unlimited session with a new rating group associated with the unlimited data session, as described in more detail below. The new rating group will be used to distinguish the unlimited data session from the customer's normal data usage and ensures that the unlimited data session will not count against the customer's normal monthly allotment of data.

RTR logic 630 may also send a notification to mobile messaging logic 660, UB logic 650 and SCM logic 610 (FIG. 10, 1050, 1055 and 1060). Mobile messaging logic 660 may use this notification to send a "push" notification to user device 110 indicating that the unlimited data session has started (block 960; FIG. 10, 1065). Display logic 530 may display a message to user device 110 indicating that the unlimited data session has started, as illustrated in FIG. 11B. Referring to FIG. 11B, user device 110 may display message 1120 indicating that the customer's 30 minute unlimited data session has started. In some implementations, a graphical status icon may be used to indicate that an unlimited data session has started.

UB logic 650 may use the session notification message to initiate the storage of the session date/start and end time, which will be used by distributed control and billing logic 620 for processing TDR records associated with the unlimited data session. SCM logic 610 may use the session notification message as confirmation to send unlimited session charges to distributed control and billing logic 620 for eventual billing, with date/time and product information.

After the unlimited data session has started and before the session ends, RTR logic 630 may determine that the unlimited data session will be ending shortly and signal the customer of the upcoming end of the session (FIG. 9, block 970; FIG. 10, 1070). For example, RTR logic 630 may signal mobile messaging logic 660 to send a message to user device 110 at a predetermined time (e.g., five minutes) before the end of the unlimited data session. In some cases, RTR logic 630 may send the signal to mobile messaging logic 660 via distributed control and billing logic 620. In each case, mobile messaging logic 660 may send a "push" notification to user device 110 indicating that the session is ending at the predetermined time in five minutes). User device 110 may display this message to the customer, as illustrated in FIG. 11C. Referring to FIG. 11C, user device 110 may display message 1130 indicating that the customer's 30 minute unlimited data session will be ending in five minutes. In some implementations, message 1130 may also inquire whether the user would like to continue the unlimited data session for another period of time, such as 30 minutes, as illustrated in message 1130 in FIG. 11C. In such implementations, service provider 130 has confirmed that the additional time slots are available for the additional period of time, based on information stored in table 800, prior to offering to continue the unlimited data session.

When the session ends, RTR logic 630 sends an end notification to distributed control and billing logic 620 (FIG. 10, 1075), which may forward the end notification to mobile messaging logic 660. Mobile messaging logic 660 may send the end notification to user device 110 to inform the customer that the unlimited data session has ended (FIG. 10, 1080).

As described above, customers may elect to purchase unlimited data sessions that will not be counted against the customer's monthly data allotment. In such scenarios, and as described briefly above with respect to FIGS. 9 and 10, service provider 130 processes customer usage associated with the unlimited data sessions to ensure the proper handling of the unlimited data session with respect to the customer's data plan, as described in more detail below.

Figure 12A:
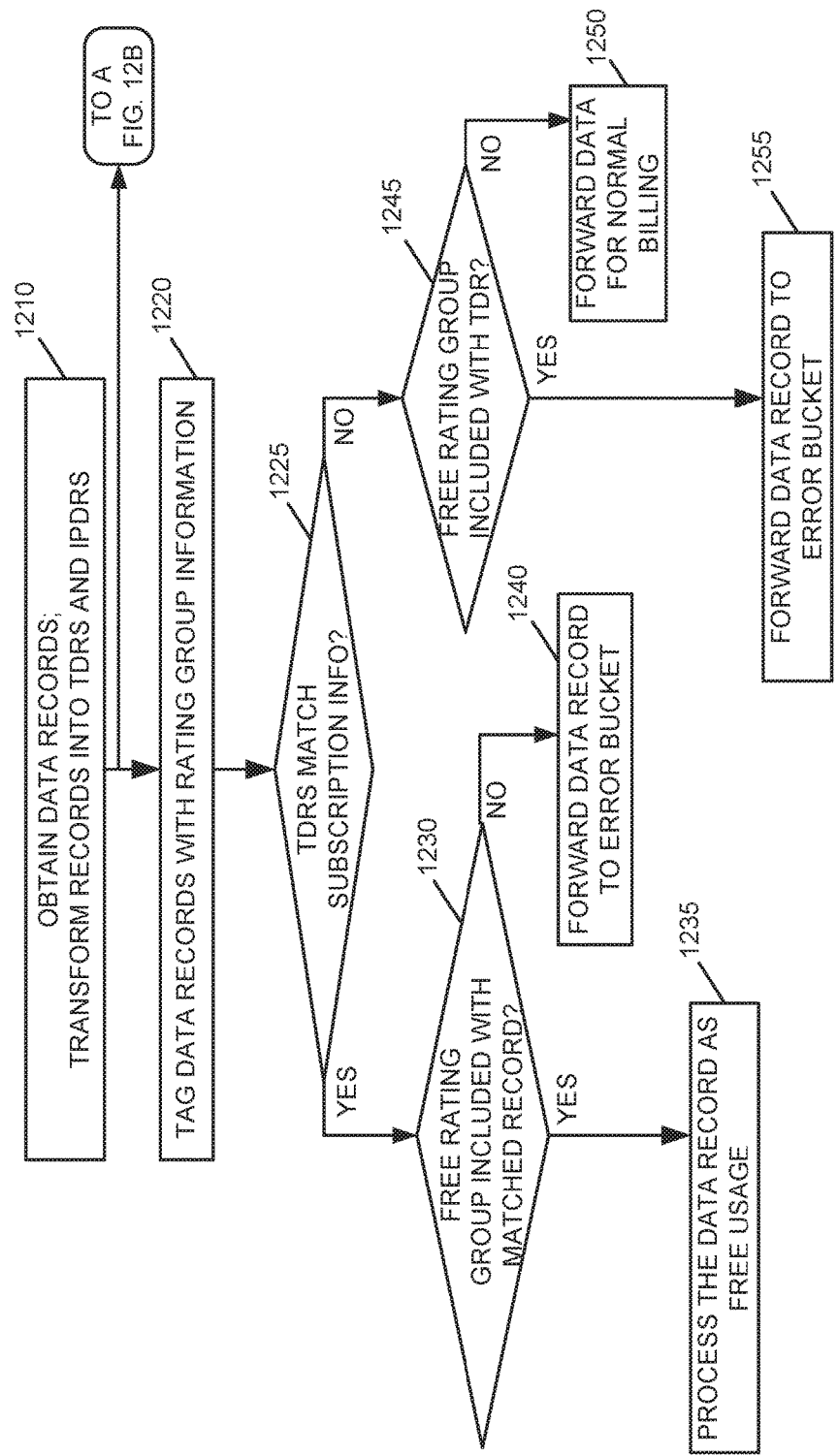
FIGS. 12A and 12B are flow diagrams associated with usage identification and billing in accordance with an exemplary implantation.

FIGS. 12A and 1B are flow diagrams illustrating exemplary processing associated with identifying data usage associated with unlimited data sessions and rating and billing customers for this unlimited data usage. Processing may begin with data mediation (DM) logic 640 obtaining data records, including usage data records, system data records, flow detail records, and authentication, authorization and accounting records, from network charging elements (block 1210). DM logic 640 may then transform the obtained records into time data records (TDRs) or Internet protocol data records (IPDRs) (block 1210). For example, TDRs may be associated with data sessions over LTE and enhanced high rate packet data (eHRPD) connections in network 150 and IPDRs may be associated with data sessions over 1x/high rate packet data (HRPD) connections in network 150. TDRs and IPDRs may each include a start time, an end time, a date and a data usage count (e.g., in Mbytes). In accordance with an exemplary implementation, processing associated with TDRs may be different than processing associated with IPDRs, as described in detail below.

DM logic 640 sends the TDRs and IPDRs to UB logic 650. SCM logic 610 may send subscription information, (also referred to herein as purchase information) corresponding to a customer's selection and usage of an unlimited data sessions via user devices 110, to UB logic 650 in real time or near real time, along with date, time and duration information associated with the unlimited data sessions. As noted above, in some implementations, TDRs and IPDRs may be handled differently. Processing associated with IPDRs is described below with respect to FIG. 12B.

For TDRs, which may be associated with LTE or eHRPD network connections, service provider 130 tags the TDRs with a unique rating group (RG) (block 1220). The unique RG may be used by other elements of service provider 130 to identify that the data session is not to be counted against the customer's data plan allotment. For example, the RG for an unlimited data session may include a value indicating that the data usage is not to be counted against the customer's data plan, while the RG for a regular data session may include a different RG or no RG, which indicate that the data usage is to be counted against the customer's plan limit.

UB logic 650 may then determine whether the TDRs match the customer subscription for the customer's unlimited data session (block 1225). For example, UB logic 650 may match a subscription associated with an unlimited data session, which includes the start time, end time and date to a particular TDR that falls within the subscription period. That is, UB logic 650 may determine whether the time information (e.g., start time, end time and date) for a TDR matches a period of time in which the user has been provided with an unlimited data session. If a TDR falls within a subscription period (block 1225—yes), UB logic 650 determines if the TDR has a RG associated with the unlimited data session included in the TDR (block 1230).

If UB logic 650 determines that a matched TDR includes the unique RG (e.g., the RG corresponding to an unlimited "free" data session) (block 1230—yes), UB logic 650 sends the unlimited data usage information for the TDR to SCM logic 610. SCM logic 610 will process the data as "free" data that does not count against the customer's data plan (block 1235). If, however, UB logic 650 determines that the matched TDR does not include the unique/free RG (block 1230—no), UB logic 650 sends the data usage information (e.g., the TDR) to an error "bucket" or storage location (block 1240). Information stored in the error bucket will be used to prevent over-billing the customer. That is, the billing system for service provider 130 will make sure that the customer was not inadvertently charged any extra fee for the data usage, other than the charges associated with the customer's data plan.

Referring back to block 1225, if UB logic 650 determines that the TDR does not match any subscription associated with the unlimited data service (block 1225—no), UB logic 650 determines if the TDR has the RG associated with unlimited data service (block 1245). If the TDR does not include the unique/free RG (block 1245—no), UB logic 650 forwards the data usage information to the billing system for normal rating/billing (block 1250). If however, UB logic 650 determines that the TDR has the unique RG (block 1245—yes), UB logic 650 routes the TDR, to a second unique error bucket or storage location (block 1255). This error bucket may be used to prevent under-billing the customer. That is, the billing system associated with service provider 130 may make sure that the customer was charged, if appropriate (e.g., agreed to by the customer), the predetermined amount for the unlimited data session.

Figure 12B:
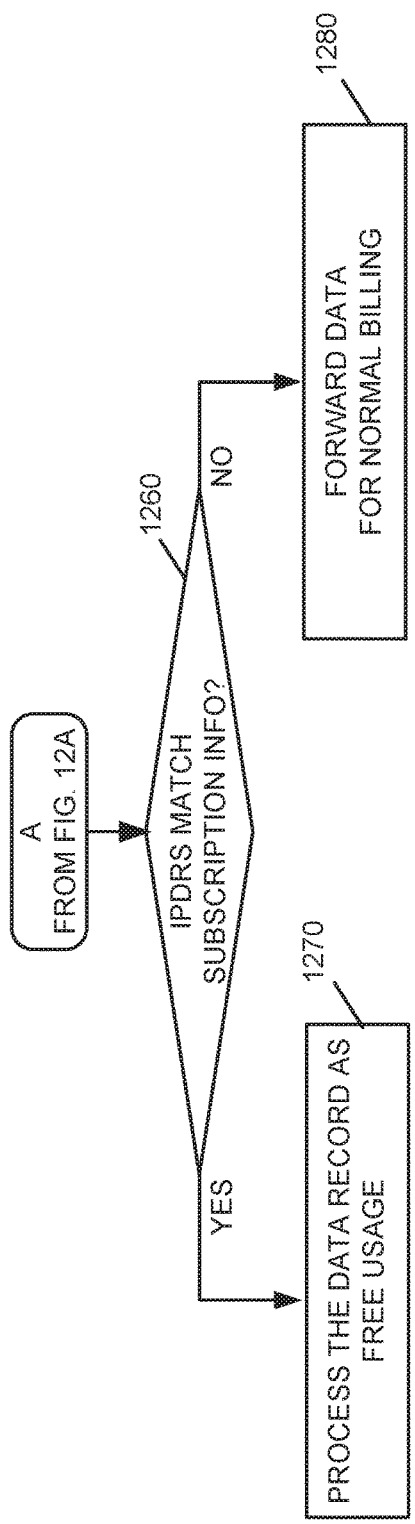

As discussed above, processing for IPDRs may be different than processing TDRs. Referring to FIG. 12B, for IPDRs, which may be associated with 1×/HRPD networks, UB logic 650 may match IPDRs with subscription records (block 1260). For example, in one implementation, no usage tagging (e.g., rating group tagging) is performed for IPDRs. In this case, if UB logic 650 identifies an IPDR that includes date, start time and end time with the corresponding date, start and end time for an unlimited data session (block 1260—yes), UB logic 650 sends the IPDR to a unique error bucket to prevent over-billing (block 1270). That is, service provider 130 ensures that the data associated with the unlimited data session is not counted against the customer's plan limit. If however, UB logic 650 does not identify an IPDR match with subscription information for an unlimited data session (block 1260—no), UB logic 650 sends the IPDR to the billing/rating system for normal billing associated with the data usage (block 1280).

When processing both TDRs and IPDRs, SCM logic 610 may send the information discussed above with respect to the unlimited data usage to the billing system of service provider 130 in real time or near real time. The billing system may then calculate pay per use (PPU) and monthly bundle charges and send this information to an invoice module for bill presentation or apply the charges to one of the customer's alternate methods of payment, such as credit card, debit card, etc., as applicable. In addition, front ends/interfaces associated with wireless data program 500 may communicate with SCM 610 to enable user device 110 to display purchase history and charges associated with unlimited data sessions, as well as summary and detail records for customer inquiries and troubleshooting.

As described above, service provider 130 may ensure that unlimited data sessions are properly identified and that usage with the unlimited data session is properly accounted for (e.g., excluded from the customer's monthly data plan limit). In addition, alerting systems that alert customers of data usage may also automatically exclude data usage from an unlimited data usage session from the alerts. For example, once a session has started, RTR logic 630 may trigger PGW 250 to start counting data usage, as described above with respect to FIGS. 9 and 10. PGW 250 may count data usage and send periodic updates to RTR logic 630.

RTR logic 630, however, excludes unlimited data usage sessions described above from normal data alerting processes to avoid incorrectly alerting customers of an overage caused by the unlimited data session. That is, RTR logic 630 will not count data usage in an unlimited data session when determining whether the customer should be alerted as to exceeding, or nearly exceeding, his/her data plan limit. RTR logic 630, however, may send data usage records to distributed control and billing system logic 620 with a unique ID on usage updates. RTR logic 630 may also send cumulative usage information in a cumulative promotional usage counter in line level usage records.

As described above, customers may select to use an unlimited data session at various times of the day based on his/her particular circumstances. As an example, assume that a customer associated with user device 110 is waiting for a friend and wants to watch a video while he/she is waiting. In this case, the customer may not want the data usage to count against his/her monthly data allotment. Therefore, the customer may launch wireless data program 500. Wireless data program 500 may display a "check availability" button. Assume that the user selects the "check availability" button. In this case, wireless data program 500 may communicate with service provider 130 and service provider 130 may provide an "available" indication (e.g., button turns green) or a "not available" indication (e.g., button turns red).

If the unlimited data service is available, wireless data program 500 may provide an offer menu that includes various input/radio buttons that show the length of available sessions and optionally, a corresponding one-time cost. Assume that the user selects the desired time slot for an unlimited data session and selects a "confirm" input located at the bottom of the offer menu. Service provider 130 may receive the confirmation and service provider 130 may send a confirmation message indicating that the unlimited data session has started.

At this point, unlimited data usage will not be deducted from the customer's monthly data allotment. At a predetermined time before the end of the session (e.g., five minutes), wireless data program 500 may automatically re-check network availability and notify the customer that the unlimited data session is ending in five minutes. Based on network availability, wireless data program 500 may receive information from service provider 130 inquiring whether the customer would like to continue the session, as discussed above with respect to FIG. 11C, or whether the customer would like to end the session. In either case, service provider 130 may provide a confirmation message to wireless data program 500, which will be displayed via user device 110. In some instances, wireless data program 500 may display a message indicating that further data usage will be billed under the customer's normal data plan.

As described above, service provider 130 may provide unlimited data sessions to customers during periods of time that will not be charged against the customer's monthly plan limit. As also described above, service provider 130 may offer the unlimited data session for a charge, or in exchange for other customer consideration, such as the customer agreeing to view or evaluate certain content, such as an advertisement, a trailer for a movie or other program, participate in a survey, etc. In some instances, a third party other than the service provider 130 may agree to sponsor and pay costs associated with the customer's unlimited data session in exchange for the customer viewing particular content associated with the third party sponsor. In such an instance, the content provided to the customer may be part of a targeted marketing campaign directed to particular customers based on customer/data analytics.

As also described above, NSS 120 may provision requests from user devices 110 on a first come, first served in basis. In other implementations, NSS 120 may account for user mobility in granting slots. For example, in some implementations, NSS 120 may check mapping table 800 for the availability of time slots in the sector to which a user device 110 is currently attached and to sectors geographically adjacent to the current sector. In other implementations, NSS 120 may check table 800 for the availability of time slots in the sector to which the user device 110 is currently attached and to sectors geographically located within a predetermined radius (e.g., 5 miles, 10 miles, 30 miles, etc.) of the user's current sector. That is, NSS 120 may check mapping table 800 for available time slots within an adjacent sector or within a distance or radius of the current sector in case the user moves to a new location outside the original sector. In this case, NSS 120 checks for availability in geographically adjacent sectors within the predetermined distance or radius. In some implementations, NSS 120 may make sure that time slots are available in the geographically adjacent sectors prior to determining whether to grant a customer's request for an unlimited session. In other implementations, NSS 120 may determine whether to de-prioritize and optionally end a user session, based on a quality of service class identifier (QCI) associated with the user session, if the user moves to sector that has no available time slots and/or is experiencing congestion.

In some implementations, NSS 120 may also check whether time slots associated with particular carrier frequencies are available in neighboring sectors prior to granting a time slot. This also accounts for user mobility over time. Still further, in some implementations, features such as carrier aggregation may be disabled when accessing available time slots. For example, carrier aggregation may aggregate multiple bands on a user device 110 simultaneously, such that a user device 110 can use, for example, a 700 Megahertz (MHz) band and another advanced wireless system (AWS) band simultaneously for downloads. In this case, granting time slots to such a user device 110 may have more impact on network 150 than if carrier aggregation is not used. To mitigate such impact, carrier aggregation may be turned off/disabled when accessing time slots identified in mapping table 800. In another alternative implementation, if a device is known to be carrier aggregation capable, then the number of slots for both carriers can be reduced by one when a request/session is granted. In another alternative implementation, if a device is known to be carrier aggregation capable, then the number of slots for both carriers can be reduced by one when a request/session is granted.

In addition, in some implementations, NSS 120 and/or service provider 130 may account for time and/or location restrictions in allotting time slots via mapping table 800. For example, NSS 120 may exclude certain areas in a city (e.g., a busy downtown business district) during working hours (e.g., 9:00 AM to 5:00 PM), or a sports stadium during a sporting event from mapping table 800. That is, e slot management logic 440 may reduce the number of available time slots (e.g., to a small number or zero) in an area that is expected to be crowded with user devices 110 that are expected to fully load network 150 during those time periods. Advance information from various systems, such as sports/concert ticketing systems, provided through application programming interfaces (APIs) may be used to determine the expected number of users at a particular location during a period of time.

As described above, time slot management logic 440 may process requests from user devices 110 on a first come, first served basis. In other implementations, NSS 120 may grant time slots to user devices that would cause less impact on overall processing throughput. For example, NSS 120 may make radio frequency (RF) power measurements, such as received signal received power (RSRP) measurements, to determine an approximate location of user device 110 based on the RSRP associated with a request. In this case, time slot management logic 440 may favor a user device 110 that has a greater RSRP value, indicating that the user is closer to the center of the sector. As a result, such a user is expected to have less impact on spectrum resources per megabyte volume than a user located on an edge portion or outer area of a sector. In this implementation, NSS 120 gives preferences to user device 110 that has less impact on overall network efficiency.

In addition, in some implementations, network 150 may support multiple scheduler classes of service. That is, traffic can be assigned to different quality of service (QoS) classes. In this case, NSS 120 may favor classes of service that will have less impact on network 150, thereby mitigating impact on other types of expected traffic.

User device 110, as described above, may include any type of computing device that is able to execute wireless data program 500. For example, as described briefly above, in one implementation, user device 110 may include a home broadband router or other device that provides network services to a customer premises, business location, etc. In one instance, user device 110 may be a home broadband router that manages a user's connections to a network that provides broadband data services, such as data, voice and video services to a customer premises. In this case, service provider 130 may signal unlimited data availability to the home broadband router during periods in which network usage associated with network 150 is light and excess capacity exists. The home broadband router may signal a user associated with the customer premises as to network availability via, for example, the user's television, computer display device, smart phone, e during periods in which excess network capacity exists. A user may then download data (e.g., stream live data, a movie, etc.) via the home broadband router during these periods of time at a data volume that may be outside or exceed the user's typical download plan limit. In this case, the user may be able to use additional bandwidth that would otherwise be unused, resulting in more efficient network usage.

Still further, as described above, third parties may sponsor unlimited data sessions. In some instances, service provider 130 may identify periods of expected excess capacity and allow third parties the opportunity to sponsor and/or bid on sponsoring unlimited data sessions provided to users In such instances, the third party may sponsor unlimited data sessions as part of a targeted marketing campaigns based on customer/data analytics.

In some implementations, service provider 130 may provide access to network services to some customers only when excess capacity is expected to exist. For example, a customer may select o data plan that allows the customer to access data services only during the periods of excess capacity. In this case, user device 110 will not be able to access network 150 during periods in which no excess time slots are available, but will be able to access unlimited data sessions during time slots when excess capacity exists. In such implementations, the customer's data plan may not be associated with any particular minimum amount of data usage, or maximum amount of data usage. In other instances, the customer may be allowed a relatively small, minimum amount of monthly usage outside of the available time slots with excess capacity.

Implementations described herein provide for estimating unused capacity on a network. The unused capacity may then be offered to customers during relatively short intervals of time. In some instance, the unused capacity may be offered as unlimited data usage over the granted periods of time and the amount of data usage during these time periods will not count against a customer's monthly data plan allotment. In some instance, the "extra" data usage will be charged to the customer at a relatively low rate, as compared to the customer's charges for data usage via the customer's regular data plan. In other instances, the extra data usage may be provided at no charge, in exchange for the user agreeing to receive and view content, rank content, participate in a survey, etc., provided by the service provider or another third party.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to estimating a capacity metric and a usage metric to identify the number of available time slots. In other implementations, other metrics that account for the number of connections on an eNodeB, the physical resource block utilization (PRBU) or the Transmission Time Interval Utilization (TTIU) may be used to identify available unused capacity. In each case, historical data usage and estimated capacity may be used to estimate unused capacity for future periods of time. The unused capacity may then be offered to customers, resulting in a more fully loaded network. In addition, offering unused to capacity to customers for unlimited usage during various periods of time may increase the utilization of network 150 during traditionally off-peak hours. This off-peak usage may result in a less congested network during typical peak times, thereby resulting in increased data throughput on network 150 and increased customer satisfaction.

In addition, implementations described above refer to estimating data capacity associated with eNodeBs that support multiple sectors and multiple sector carriers. It should be understood that implementations described herein can be used with a network in which eNodeBs or cell sites support one sector and/or one carrier. Still further, implementations have been described herein as measuring data capacity and usage on a sector carrier level granularity. In other implementations, data capacity and usage could be measured/estimated on a higher or lower granularity (e.g., a sector level, a sub-carrier level, etc.).

Further, while series of acts have been described with respect to FIGS. 7, 9, 12A and 12B, and signal flows with respect to FIG. 10, the order of the acts and signal flows may be different in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:
1. A computer-implemented method, comprising:
   determining, by at least one computing device, a number of user devices that can access data services in a wireless network via each of a plurality of sectors for each of a plurality of periods of time based on capacity in the wireless network;

storing, by the at least one computing device, information identifying the determined number of user devices for each of the plurality of sectors for each of the plurality of periods of time;

receiving a request from a first user device for access to data services during a first one of the plurality of periods of time, wherein the first user device is associated with a first sector and the first user device is associated with a first user having a data plan;

accessing the stored information to determine whether to grant the request;

providing access to the data services via the wireless network to the first user device during the first period of time, in response to determining to grant the request; and excluding data usage by the first user device during the first period of time from being applied against a data limit associated with the first user's data plan.

2. The computer-implemented method of claim 1, further comprising:

generating a data record associated with data usage by the first user device during the first period of time; and marking the data record to indicate that the data usage by the first user device during the first period of time is not to be counted against the data limit.

3. The computer-implemented method of claim 2, wherein marking the data record comprises:

marking the data record with a rating group associated with an unlimited data session.

4. The computer-implemented method of claim 1, wherein the excluding data usage comprises:

at least one of not tracking or not counting data usage by the first user device during the first time period.

5. The computer-implemented method of claim 1, further comprising:

forwarding information, to the first user device, identifying at least one time period in which unlimited data usage is available for use by the first user, wherein usage during each of the at least one time period is provided to the first user after the first user views additional content or participates in a survey.

6. The computer-implemented method of claim 1, further comprising:

forwarding information, to the first user device, identifying at least one time period in which unlimited data usage is available for use by the first user, wherein usage during each of the at least one time period is associated with a fixed charge.

7. The computer-implemented method of claim 1, further comprising:

sending a message to the first user device a predetermined period of time before expiration of the first period of time, the first message indicating that a data session is coming to an end.

8. The computer-implemented method of claim 7, further comprising:

sending a second message to the first user device prior to expiration of the first period of time, the second message inquiring whether the first user would like to continue an unlimited data session that commences after the first period of time expires.

9. The computer-implemented method of claim 1, further comprising:

receiving an availability request from the first user device; and providing information, to the first user device, indicating whether an unlimited data session for the first user is currently available.

10. The computer-implemented method of claim 9, further comprising:

determining, based on conditions associated with the first user device, whether the unlimited data session is currently available for the first user device, wherein the conditions comprise at least one of radio frequency conditions associated with a connection from the first user device to the wireless network.

11. A system, comprising:

a memory; and at least one device configured to:

determine a number of user devices that can access data services in a wireless network via each of a plurality of sectors for each of a plurality of periods of time based on capacity in the wireless network;

store information identifying the determined number of user devices for each of the plurality of sectors for each of the plurality of periods of time;

receive a request from a first user device for access to data services during a first one of the plurality of periods of time, wherein the first user device is associated with a first sector and the first user device is associated with a first user having a data plan;

access the stored information to determine whether to grant the request;

provide access to data services via the wireless network to the first user device during the first period of time, in response to determining to grant the request; and exclude data usage by the first user device during the first period of time from being applied against a data limit associated with the first user's data plan.

12. The system of claim 11, wherein the at least one device is further configured to:

generate a data record associated with data usage by the first user device during the first period of time; and mark the data record to indicate that the data usage by the first user device during the first period of time is not to be counted against the data limit.

13. The system of claim 12, wherein the at least one device is further configured to:

forward information, to the first user device, identifying at least one time period in which unlimited data usage is available for use by the first user, wherein usage during each of the at least one time period is provided after the first user views additional content or participates in a survey.

14. The system of claim 12, wherein the at least one device is further configured to:

send a message to the first user device a predetermined period of time before expiration of the first period of time, the first message indicating that a data session is coming to an end and inquiring whether the first user would like to continue an unlimited data session that commences after the first period of time expires.

15. The system of claim 12, wherein the at least one device is further configured to:

receive an availability request from the first user device; and determine, based on conditions associated with the first user device, whether an unlimited data session is currently available for the first user device, wherein the conditions comprise at least one of radio frequency conditions associated with a connection from the first user device to the wireless network.

16. A non-transit computer-readable medium having stored thereon sequences of instructions which, when executed by at least one processor, cause the at least one processor to:
- determine a number of user devices that can access data services in a wireless network via each of a plural of sectors for each of a plurality of periods of time based on capacity in the wireless network;
- store information identifying the determined number of user devices for each of the plurality of sectors for each of the plurality of periods of time;
- receive a request from a first user device for access to data services during a first one of the plurality of periods of time, wherein the first user device is associated with a first sector and the first user device is associated with a first user having a data plan;
- access the stored information to determine whether to grant the request;
- provide access to data services via the wireless network to the first user device during the first period of time, in response to determining to grant the request; and
- exclude data usage by the first user device during the first period of time from being applied against a data limit associated with the first user's data plan.

17. The non-transitory computer-readable medium of claim 16, wherein the instructions further cause the at least one processor to
- generate a data record associated with data usage by the first user device during the first period of time; and
- mark the data record to indicate that the data usage by the first user device during the first period of time is not to be counted against the data limit.

18. The non-transitory computer-readable medium of 16, wherein the instructions further cause the at least one processor to:
- forward information, to the first user device, identifying at least one time period in which unlimited data usage is available for use by the first user, wherein usage during each of the at least one time period is provided after the first user views additional content or participates in a survey.

19. The non-transitory computer-readable medium of 16, wherein the instructions further cause the at least one processor to:
- send a message to the first user device a predetermined period of time before expiration of the first period of time, the first message indicating that a data session is coming to an end and inquiring whether the first user would like to continue an unlimited data session that commences after the first period of time expires.

20. The non-transitory computer-readable medium of 16, wherein the instructions further cause the at least one processor to:
- receive an availability request from the first user device; and
- determine, based on conditions associated with the first user device, whether an unlimited data session is currently available for the first user device, wherein the conditions comprise at least one of radio frequency conditions associated with a connection from the first user device to the wireless network.

* * * * *